United States Patent
Kim et al.

(10) Patent No.: US 8,343,690 B2
(45) Date of Patent: Jan. 1, 2013

(54) FABRICATION OF MESOPOROUS METAL ELECTRODES IN NON-LIQUID-CRYSTALLINE PHASE AND ITS APPLICATION

(75) Inventors: Hee-Chan Kim, Seoul (KR); Taek Dong Chung, Seoul (KR); Sejin Park, Seoul (KR); Hankil Boo, Seoul (KR); Sunyoung Lee, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 300 days.

(21) Appl. No.: 11/722,781

(22) PCT Filed: Dec. 23, 2005

(86) PCT No.: PCT/KR2005/004487
§ 371 (c)(1),
(2), (4) Date: Jun. 25, 2007

(87) PCT Pub. No.: WO2006/068444
PCT Pub. Date: Jun. 29, 2006

(65) Prior Publication Data
US 2008/0096089 A1    Apr. 24, 2008

(30) Foreign Application Priority Data

Dec. 23, 2004 (KR) .................. 10-2004-0110900

(51) Int. Cl.
*H01M 4/02* (2006.01)
*B23H 3/04* (2006.01)
*B01J 19/08* (2006.01)
*B05D 3/00* (2006.01)
*B05D 5/12* (2006.01)

(52) U.S. Cl. .................. 429/523; 204/290.1; 427/457; 427/532; 427/77

(58) Field of Classification Search .................. 429/40, 429/12; 204/290.01, 416, 434; 427/457, 427/532, 77
See application file for complete search history.

(56) References Cited

U.S. PATENT DOCUMENTS 5,858,457 A    1/1999    Brinker et al.
6,203,925 B1 *    3/2001    Attard et al. .................. 428/613
(Continued)

FOREIGN PATENT DOCUMENTS

KR    10-2004-0026323    3/2004
(Continued)

OTHER PUBLICATIONS

Anca Nicoleta Galatanu, et al., Ternary Phase Diagram of the Triton X-100/Poly (acrylic acid)/Water System, *Langmuir* 16 (2000), pp. 4922-4928. Published on web Jun. 21, 2000.

(Continued)

*Primary Examiner* — Melvin C Mayes
*Assistant Examiner* — Bijay Saha
(74) *Attorney, Agent, or Firm* — Stein McEwen, LLP (57) ABSTRACT

A method for the fabrication of a mesoporous metal electrode in a non-liquid crystalline phase was tested. Specifically, there was tested the efficacy of the method for the fabrication of a mesoporous metal electrode which comprises forming the mesoporous metal electrode on a substrate by chemical or electrochemical reduction of a mixture comprising a solvent, a structure-directing agent, and a source of a metal, characterized in that the mixture is maintained in a non-liquid crystal phase. Furthermore, the usefulness of the mesoporous metal electrode thus prepared from the non-liquid crystalline phase was also tested. The mesoporous metal electrode prepared from the non-liquid crystalline phase had a large surface area, and a roughness factor thereof was controlled by charges passed during electroplating. The method made it possible to fabricate the mesoporous metal electrode in the non-liquid crystalline phase, even more flexible than a liquid crystalline phase. The mesoporous metal electrode prepared by the method had randomly distributed mesopores on the surface thereof and retained a large roughness factor. The method was found to be a good alternative to the conventional fabrication of porous platinum films in the liquid crystalline phase. Furthermore, the method was found to be suitably applicable to automatic processes, because the mesoporous metal electrode was prepared in the highly flexible non-liquid crystalline phase. Recovery and recycling of raw materials were also improved. The mesoporous metal electrode prepared by the method can be suitably used for the detection of glucose and proton, and as a cathode or an anode of fuel cells.

8 Claims, 6 Drawing Sheets

U.S. PATENT DOCUMENTS

| | | | |
|---|---|---|---|
| 6,395,350 B1* | 5/2002 | Balkus et al. | 427/556 |
| 6,420,063 B1* | 7/2002 | Ozin et al. | 429/40 |
| 6,503,382 B1 | 1/2003 | Bartlett et al. | |
| 2004/0016646 A1* | 1/2004 | Stucky et al. | 205/111 |
| 2006/0008667 A1 | 1/2006 | Kim et al. | |

FOREIGN PATENT DOCUMENTS

| | | |
|---|---|---|
| KR | 10-2006-0072266 | 6/2006 |
| WO | WO 02/075826 | 9/2002 |

OTHER PUBLICATIONS

Sejin Park, et al., pH-Sensitive Solid-State Electrode Based on Electrodeposited Nanoporous Platinum, *Anal. Chem*, vol. 77, No. 23, Dec. 1, 2005, pp. 7695-7701. Published on web Oct. 26, 2005.

Kyoung-Shin Choi, et al., Electrocatalytic Properties of Thin Mesoporous Platinum Films Synthesized Utilizing Potential-Controlled Surfactant Assembly, *Advanced Materials*, vol. 15, No. 23, Dec. 3, 2003, pp. 2018-2021.

Sejin Park, et al., Nonenzymatic Glucose Detection Using Mesoporous Platinum, *Anal Chem.*, vol. 15, No. 13, Jul. 1, 2003, pp. 3046-3049. Published on web May 15, 2003.

George S. Attard, et al., Lyotropic Liquid Crystalline Properties of Nonionic Surfactant/$H_2O$/Hexachloroplatinic Acid Ternary Mixtures Used for the Production of Nanostructured Platinum, *Langmuir*, vol. 14, 1998, pp. 7340-7342. Published on web Dec. 3, 1998.

Sejin Park et al., "Three-Dimensional Interstitial Nanovoid of Nanoparticulate Pt Film Electroplated from Reverse Micelle Solution", *Chemistry of Materials*, www.pubs.acs.org., published on Jun. 15, 2007.

* cited by examiner

FABRICATION OF MESOPOROUS METAL ELECTRODES IN NON-LIQUID-CRYSTALLINE PHASE AND ITS APPLICATION

TECHNICAL FIELD

The present invention relates to a method for the fabrication of a mesoporous metal electrode. More specifically, the present invention relates to a method for the fabrication of a mesoporous metal electrode in a non-liquid crystalline mixture solution of a source of a metal and a structure-directing agent. The present invention also relates to a mesoporous metal electrode prepared by the method and its application.

BACKGROUND ART

Metallic thin films with roughness of nano-scale are of great use and importance in the fields of energy storage materials, catalysts, and sensors. In spite of their importance, however, only a few methods have been suggested to fabricate such nanoporous metal films. The examples include chemical/electrochemical deposition in a liquid crystalline template or dealloying of alloys. U.S. Pat. No. 6,203,925 discloses a method for the fabrication of a porous metal electrode having a substantially regular structure and uniform pore size. The method disclosed in the U.S. Pat. No. 6,203,925 comprises reducing a mixture including a source of a metal; a solvent; and a structure-directing agent present in an amount sufficient to form a liquid crystalline phase in the mixture, to form a metal-organic composite, and removing the organic from the composite. Another exemplarily method for the fabrication of the mesoporous metal electrode is disclosed in U.S. Pat. No. 6,503,382. The method disclosed in the U.S. Pat. No. 6,503,382 comprises electrodepositing a metal-organic composite from a mixture onto a substrate to form a porous film, wherein the mixture comprises a source of a metal, a solvent, a structure-directing agent in an amount sufficient to form a homogeneous lyotropic liquid crystalline phase in the mixture, and removing the organic from the metal-organic composite. The method has an advantage to produce mesoporous metal electrode with a regular structure and uniform pore size. However, the methods suffered from the disadvantage that they could be applicable only to the liquid crystalline phase such as lamellar ($L_\alpha$), hexagonal ($H_1$), and cubic ($V_1$) phase, preferably to $H_1$ or $V_1$ phase. Mixtures having the liquid crystalline phase have very high viscosity. As thus, highly viscous residues remain on the substrate even after the substrate onto which the metal-organic composite was already formed is lift off from the liquid crystalline mixture. As a result, physical removing of the residues should be performed before subjecting the substrate to the step of removing the organic from the metal-organic composite. The removal of the residues is a manually-performed, cumbersome work and prohibits automation of the manufacturing processes. Moreover, the method requires highly concentrated metal source. According to U.S. Pat. Nos. 6,203,925 and 6,503,382 mentioned in the above, the concentration of the metal source reaches up to 29 wt %, based on the mixture of the solvent and the structure-directing agent (Langmuir, 1998, 14, 7340-7342, Attard et al.). However, excessive use of the metal source makes the method to be ineffective and expensive, and deteriorates the disadvantages caused by the residing of highly viscous residues on the substrate. Moreover, the temperature must be kept as low as possible in order to maintain the mixture in a liquid crystalline phase. According to the phase study by Attard et al. (Langmuir, 1998, 14, 7340-7342), octaethyleneglycol monododecylether ($C_{12}EO_8$, in which EO represents ethyleneoxide), which is a representative structure-directing agent, does give a liquid crystalline mixture at above 85° C. In addition, octylphenoxy-polyethoxy ethanol (Triton X-100™) gives a liquid crystalline mixture only at a temperature of no more than 20-30° C. (Langmuir 2000, 16, 4922-4928, Galatanu et al.). The addition of the metal source further interferes with the formation of the liquid crystalline phase. As a result, the methods disclosed in the above two U.S. patents have a limit in terms of the temperature. Low temperature retards the electroplating rate, and so it takes long time to fabricate the mesoporous metal electrode. In addition, some structure-directing agents due to the limitation of the temperature are not applicable to the methods.

Stucky et al. (Advanced Materials, 2003, 15, 2018) showed that the potential-controlled-surfactant-assembly method worked in the solution of low surfactant concentration around critical micelle concentration (cmc). According to their report, cylindrical/hemicylindrical micelle assembly was formed below cmc on electrode/solution interface by electric field and functioned as a template for nanoporous platinum thin film with pore size of ~4 nm and wall thickness of ~4 nm. In these cases, 100 nm-thick platinum films could be formed within 30 s and the problems encountered in the liquid-crystalline-template method seem to be relieved. However, the electrical field at the surface substantially affects the morphology of the plated platinum in this method. Nanoporous platinum was deposited only near 0.2 V versus Ag/AgCl (4 M KCl), where cylindrical/hemicylindrical assembly was produced. In the other potential range, bilayer assembly appeared and inhibited the nanopore formation.

DISCLOSURE

Technical Problem

Therefore, in order to solve the above disadvantages, an object of the present invention is to provide a method for the fabrication of a mesoporous metal electrode from a non-liquid crystalline solution. Specifically, there is provided a method for the fabrication of a mesoporous metal electrode, comprising chemically or electrochemically reducing a mixture comprising a solvent, a structure-directing agent and a source of a metal to deposit a metal-organic composite onto a substrate to obtain the mesoporous metal electrode, characterized in that the mixture is maintained in a non-liquid crystalline phase, and the deposition of the metal-organic composite onto the substrate is performed in the non-liquid crystalline mixture.

Technical Solution

According to a preferred embodiment of the present invention, there is provided a method for the fabrication of a mesoporous metal electrode, comprising the steps of maintaining a mixture comprising a solvent, a surfactant and a source of a metal in a non-liquid crystalline phase, dipping a substrate into the mixture, reducing the mixture to deposit a metal-organic composite onto the substrate, removing residues on the substrate onto which the metal-organic composite is formed, and extracting the organic from the metal-organic composite.

According to more preferred embodiment of the present invention, there is provided a method for the fabrication of a mesoporous metal electrode, wherein the step of removing residues is preformed by air-blowing.

According to even more preferred embodiment of the present invention, the mixture is maintained in an isotropic, non-liquid crystalline phase. Specifically, the mixture is present either as a micelle phase in which the structure-directing agent is surrounded by the solvent or as a reverse micelle phase in which the solvent droplets are surrounded by the structure-directing agent. Most preferably, the mixture is present as a reverse micelle phase.

According to another preferred embodiment of the present invention, there is provided a method for the fabrication of a mesoporous metal electrode, wherein the metal is selected from the group consisting of platinum, ruthenium, gold, nickel, palladium, silver, cobalt, iron, lead, tin and iridium.

According to further another preferred embodiment of the present invention, there is provided a method for the fabrication of a mesoporous metal electrode wherein the deposition of the metal-organic composite onto the substrate is carried out by electroplating.

According to further another preferred embodiment of the present invention, there is provided a method for the fabrication of a mesoporous metal electrode wherein the non-liquid crystalline mixture comprises water, a surfactant, and a source of a metal. As a surfactant, a non-ionic surfactant is particularly preferable.

Another object of the present invention is to provide a mesoporous metal electrode prepared by the above method. The mesoporous metal electrode can be used as a glucose sensor, a pH sensor, and a reference electrode. Also, it can be used as a cathode or an anode of fuel cells.

Advantageous Effects

The mesoporous metal electrode fabricated from the non-liquid crystalline solution of a structure-directing agent and a source of a metal has randomly distributed pores and high roughness factor. The method of the present invention is a good alternative to the conventional fabrication of porous platinum films in the liquid crystalline phase. Furthermore, the method is suitably applicable to automatic processes because the mesoporous metal electrode is prepared in the highly flexible non-liquid crystalline phase. Recovery and recycling of raw materials are also improved. Plating speed can be increased by increasing the temperature. To the contrary, the conventional method adopting the liquid crystalline phase suffers from the temperature limitation, because the liquid crystalline phase can be obtained only at low temperature. The mesoporous metal electrode of the present invention can be used as a non-enzymatic glucose sensor, a pH sensor, and a reference electrode. The electrode system with mesoporous structure provides valuable advantages in the field of electrochemical systems such as chemical sensors, biochemical sensors and micro-total-analysis-systems (μ-TAS). This system is easy to construct, less time-consuming for the manufacturing reproducible product, and is suitable for mass-production.

MODE FOR INVENTION

According to the method of the present invention, a mesoporous metal electrode is fabricated from a non-liquid crystalline phase, rather than the conventional liquid crystalline phase. Specifically, there is provided a method for the fabrication of a mesoporous metal electrode, comprising chemically or electrochemically reducing a mixture comprising a solvent, a structure-directing agent and a source of a metal to deposit a metal-organic composite onto a substrate to obtain the mesoporous metal electrode, characterized in that the mixture is maintained in a non-liquid crystalline phase, and the deposition of the metal-organic composite onto the substrate is performed in the non-liquid crystalline mixture.

In order to maintain the structure-directing agent in a liquid crystalline phase, the temperature of the mixture must be kept low. Also, the liquid crystalline phase has high viscosity. Even though the mesoporous metal electrode prepared from the liquid crystalline mixture has a regular structure and uniform pore size, high viscosity and low temperature requires manual removal of residues and deterioration of productivity due to slow plating rate. In the liquid crystalline mixture, these disadvantages are inevitable.

Surprisingly enough, it is confirmed that the mesoporous metal electrode can be prepared in a non-liquid crystalline mixture and the resulting mesoporous metal electrode shows substantially the same behaviors as the one prepared in the liquid crystalline mixture. Also, the fabrication of the mesoporous metal electrode in the non-liquid crystalline mixture solves the problems resulted from the liquid crystalline mixture. The method of the present invention has sufficient plating speed even at low concentration of the metal source, and allows elevating the temperature of the mixture sufficiently. According to the specific embodiment of the present invention, the fabrication of the mesoporous platinum electrode was successfully performed only at the low levels (1-5 wt %) of platinic acid. The use of the non-liquid crystalline mixture with low viscosity makes it possible to remove the residues by a simple work such as air-blowing, rather than manual removal. High temperature increases the plating speed and productivity of the mesoporous metal electrode.

The method for the fabrication of a mesoporous metal electrode, in accordance with the present invention, comprises the steps of maintaining a mixture comprising a solvent, a structure-directing agent and a source of a metal in a non-liquid crystalline phase, dipping a substrate into the mixture, reducing the mixture to deposit a metal-organic composite onto the substrate, removing residues on the substrate onto which the metal-organic composite is formed, and extracting the organic from the metal-organic composite. Herein, the removal of the residues on the substrate is carried out by simple process such as air-blowing. This enables to avoid manual removal of the residues. So, the mesoporous metal electrode can be mass-produced by automation of the manufacturing processes.

The maintenance of the mixture as the non-liquid crystalline phase depends on the amount of the structure-directing agent, the temperature, and the solvent to be used. The kind of the structure-directing agent is not particularly limited. Various structure-directing agents that had been used in the art can be suitably adapted to the fabrication of the mesoporous metal electrode of the present invention. Preferable structure-directing agents are surfactants. Non-ionic surfactants are more preferable. Non-ionic surfactants are less sensitive to the electric field applied than ionic surfactants. So, there is little limitation by the voltage and the reproducibility is increased. Desirable examples of the surfactants are octylphenoxy-polyethoxy ethanol (Triton X-100™), octaethyleneglycol monododecyl ether ($C_{12}EO_8$), octaethyleneglycol monohexadecyl ether ($C_{16}EO_8$). Particularly desirable is octylphenoxy-polyethoxy ethanol. Besides, materials such as monoglycerides, phospholipids, glycolipods, and block-copolymers can be used as a structure-directing agent. With regard to the kind of the structure-directing agent, please refer to U.S. Pat. Nos. 6,203,925 and 6,503,382 mentioned in the above. The description of the two patents and documents cited are hereby incorporated by reference.

The desirable solvent in the non-liquid mixture of the present invention is water. The solvent dissolves a source of a metal (or a metal precursor). In order to increase ionic conductivity, electrolytes can be additionally dissolved. If necessary, a mixed solvent system of more than two solvents can be adopted. Sometimes, the reduction process can be carried out in a non-aqueous solvent.

Various metal thin films having mesopores, such as platinum, ruthenium, gold, nickel, paladium, silver, cobalt, iron, lead, tin and iridium can be formed on the substrate. With regard to the source of a metal to be used, please also refer to U.S. Pat. Nos. 6,203,925 and 6,503,382 mentioned in the above. According to the specific embodiment of the present invention, platinic acid, added in an amount of 1-5 wt % based on total weight of the mixture, gave satisfactory results.

The mixture according to the present invention is present as a non-liquid crystalline phase. It exists as an isotropic non-liquid crystalline phase, not as a liquid crystalline phase, that is, anisotropic metaphase. Specifically, the mixture exists either in an isotropic micelle or in an isotropic reverse micelle. In the micelle phase, the structure-directing agent is surrounded by the solvent. In the reverse micelle phase, the solvent droplets are surrounded by the structure-directing agent. Most preferably, plating of the mesoporous thin film onto the substrate is carried out in a reverse micelle phase in which the solvent droplets are surrounded by surfactants.

The temperature can be suitably chosen regarding the solvent to be used, the amount of the structure-directing agent, and the amount of the platinic acid. For example, when 5 w % of platinic acid was added to the mixture of water and octylphenoxy-polyethoxy ethanol (Triton X-100™) in a ratio of 45:50 (wt/wt) at 40° C., the reverse micelle phase was obtained. As the amount of octylphenoxy-polyethoxy ethanol was decreased up to above critical micelle concentration, the micelle phase was obtained.

Formation of the metal-organic composite on a substrate is carried out by reducing the mixture into which the substrate is inserted. Herein, the reduction can be accomplished in a chemical or electrochemical method. Please refer to U.S. Pat. No. 6,203,925 for the details of the chemical reduction. Electrochemical reduction is preferable. The electrochemical reduction is carried out by applying the electric field while the substrate is dipped into the mixture. This is simple and suitable for the improvement of the characteristics of the electrode obtained. Please refer to U.S. Pat. No. 6,503,382 for more details.

The substrate onto which the metal-organic composite are formed is lift off from the mixture solution, and residues on the substrate are removed. The residues can be easily removed due to its low viscosity. Simple process such as air-blowing can be adopted, instead of manual removal. Thereafter, the substrate subjects to an extraction. By the extraction process, the organic is removed from the metal-organic composite, and a mesoporous metal electrode is obtained.

According to the test results in various conditions, it was confirmed that the mesoporous metal electrode prepared from the non-liquid crystalline mixture exhibits substantially the same characteristics as the one prepared from the conventional liquid crystalline mixture.

In the following, the present invention will be more fully explained referring to Examples. However, it should be understood that the examples are suggested for the purpose of illustration. The present invention is not limited thereto.

EXAMPLES

Materials

Triton X-100™ (Sigma), hexachloroplatinic acid hydrate (Aldrich), D-(+)-glucose (Sigma) and sulfuric acid were used without further purification. Gold and platinum disk electrodes were used. Another platinum disk electrode was used as flat platinum electrode after polished with alumina (0.3 μm).

Instruments

Electrochemical experiments were performed using an electrochemical analyzer (Model CH660, CH Instruments Inc., Austin, Tex. 78733). As an exemplarily sample, a gold or platinum rod electrode (0.0079 $cm^2$) was employed as a substrate electrode for the deposition of mesoporous platinum film. Ag/AgCl (3 M KCl) and a platinum wire were used as a reference electrode and a counter electrode, respectively.

Preparation of the Non-Liquid Crystalline Mixture

Triton X-100™, a distilled water into which conductive electrolytes are dissolved, and hexachloroplatinic acid hydrate were mixed in a ratio of 50:50-x:x by weight, in which x has a value in a range of from 1 to 10. Then, the mixture was heated up to 40° C. Polarization microscopic test revealed that the mixture had a reverse micelle phase. Into the homogeneous mixture, the substrates were dipped.

Fabrication of the Mesoporous Platinum Electrode by Electroplating of a Platinum-Organic Composite onto the Substrate Followed by Extraction Electroplating was carried out onto a polished platinum disk electrode, by applying a constant potential in a range of −0.1 and −0.25 V versus Ag/AgCl. The thickness of the platinum-organic composite was found to be proportional to the electroplating time, the temperature and the potential passed. The substrate electrode onto which the platinum-organic composite was formed was lift off from the mixture and residues residing on the substrate was removed by air-blowing. The resulting nanoporous platinum electrode was placed in distilled water for 1 h to extract the organics (Triton X-100™), and the extraction procedure was repeated 3-4 times. The electrode as treated was then electrochemically cleaned by cycling potential between +1.2 and −0.22 V versus Ag/AgCl in 1.0 M sulfuric acid until reproducible cyclic voltammograms were obtained. The mesoporous metal electrode thus obtained was named as $L_2$-ePt.

Figure 1:
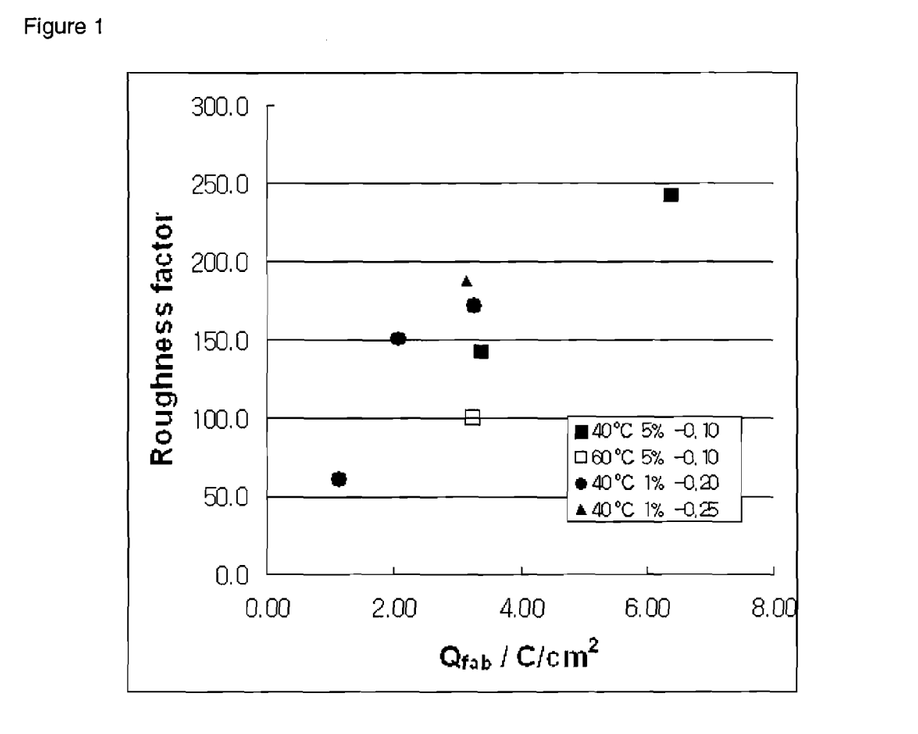
FIG. 1 is a graph showing roughness factors of platinum electrodes versus the charge passed during electroplating at various potentials, temperatures, and concentrations of platinic acid.
Figure 2:
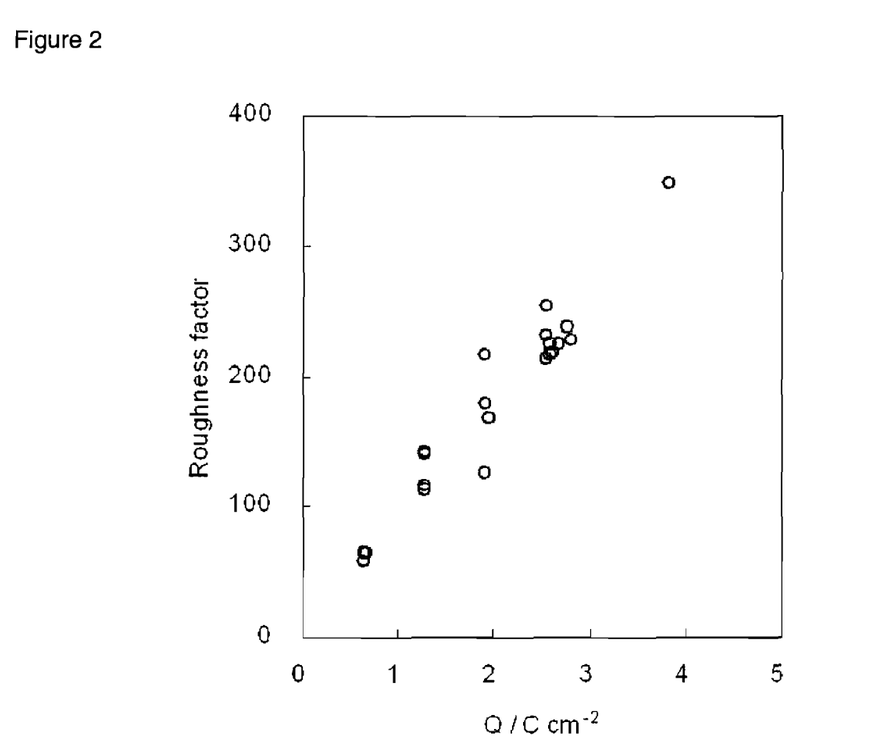
FIG. 2 is a graph showing the dependence of roughness factors on the charge passed during electroplating. The electroplating was conducted in 5% hexacholoroplatinic acid at 40° C. and −0.2 V versus Ag/AgCl.

Morphology Analysis of the Mesoporous Metal Electrode Prepared from the Non-Liquid Crystalline Mixture The surface area of $L_2$-ePt was determined by measuring the area under the hydrogen adsorption/desorption peaks of the cyclic voltammograms (scan rate, 0.2 V sec$^{-1}$) in 1.0 M sulfuric acid solution. A conversion factor of 210 C cm$^{-2}$ was used to determine the electrode area. The $L_2$-ePt prepared from the non-liquid crystalline mixture showed largely increased surface area, compared to $H_1$-ePt manufactured by Attard et al. Specifically, the cyclic voltammogram measured in 1M $H_2SO_4$ showed very large hydrogen adsorption/desorption peaks. FIG. 1 is the graph showing the results of the test on the roughness factor of the platinum electrode versus the charge passed during the electroplating at various potentials, temperatures, and concentrations of platinic acid. FIG. 2 is the graph showing the dependence of roughness factors on the charge passed during electroplating. The results showed that the roughness factor of the platinum film increases as the charges passed is increased, and the roughness factor can be controlled by the charge passed. FIGS. 1 and 2 showed that the roughness factor of the mesoporous platinum film reaches to several hundreds under various platinum concentrations and potentials applied.

Figure 3:
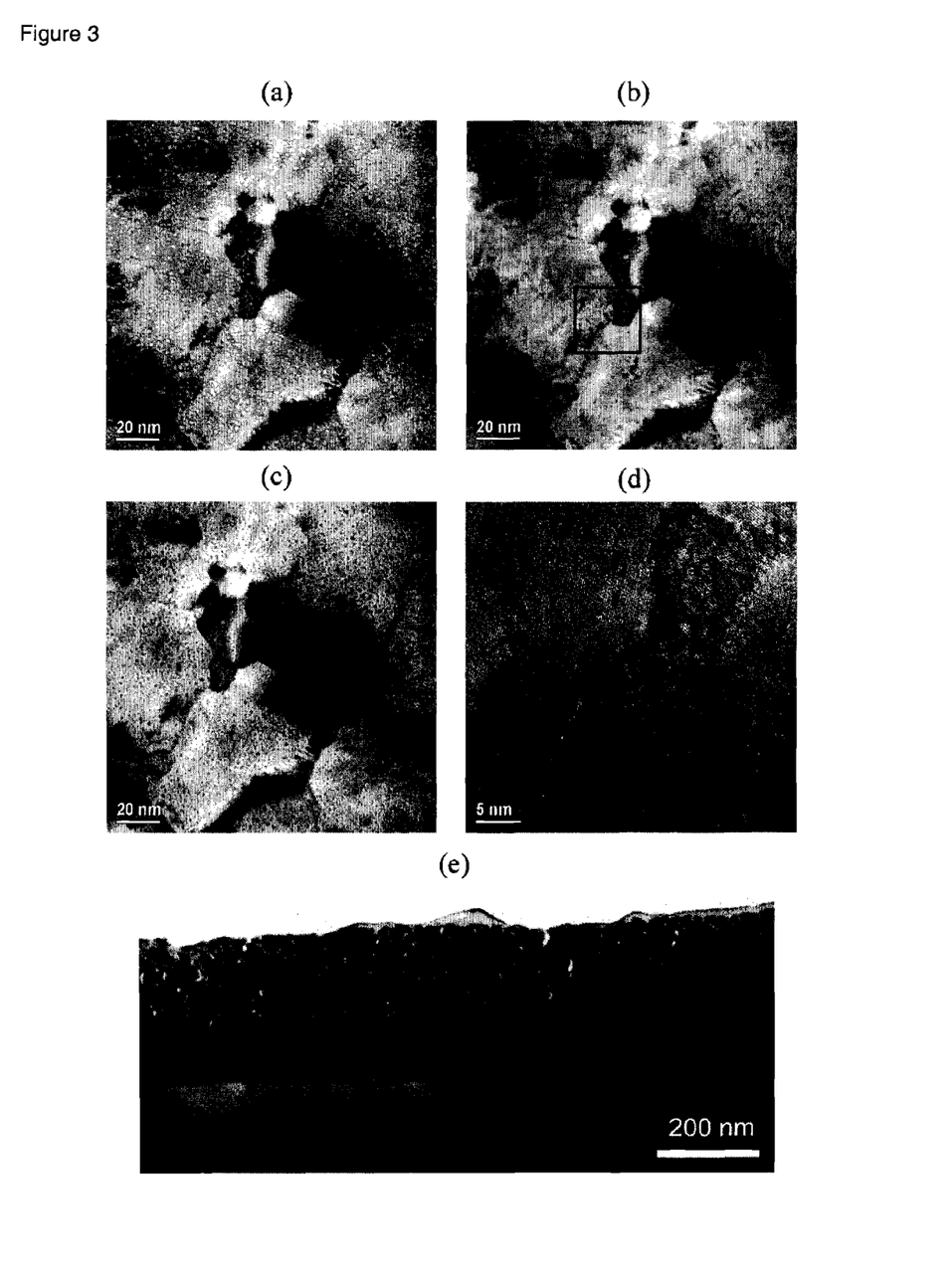
FIG. 3 are transmission electron microscopic images showing the mesoporous metal electrode of the present invention, wherein (a) is under focus view, (b) is in focus view, (c) is over focus view, (d) is closer view of the selected area of (b), and (e) is cross sectional view, respectively.

To observe the surface structure of the mesoporous film, transmission electron microscopic images were attained. FIG. 3 are transmission electron microscopic images showing mesoporous metal electrode of the present invention, wherein (a) is under focus view, (b) is in focus view, (c) is over focus view, (d) is closer view of the selected area of (b), and (e) is cross sectional view, respectively. The TEM images showed that the pore size was in a range of 1.5-3 nm, and the pore-pore distance was 1.5-3 nm. The closer view of FIG. 3(*d*) showed that the pores were randomly distributed without any lattice. These are critically distinguished from the mesoporous metal electrodes manufactured from the liquid crystalline phase by Attard et al. and the mesoporous metal electrode from potential controlled surfactant assembly by Stucky et al.

Use of the Mesoporous Platinum Electrode as a Glucose Sensor

Glucose sensor with $L_2$-ePt as a working electrode was manufactured. In the Korean Patent application No. 2002-0005774, PCT/KR03/00884 and the paper (*Analytical Chemistry*, 2003, 75(13), 3046), usefulness and principles of a mesoporous metal electrode as a glucose sensor are well described. The key idea behind the present study is based on the fact that the roughness of the mesoporous electrodes is even smaller than the scale of the chronoamperometric diffusion field in most cases. Since the diffusion layers reach several micrometers away from the electrode surface in milliseconds, reactants inside the mesopores (2-50 nm in diameter) are depleted in diffusion-controlled electrochemical systems. As a result, for rapidly oxidizable and/or reducible reactants, the faradaic current is proportional to the apparent geometric area of the electrode regardless of the mesoporous roughness. On the other hand, faradaic current associated with kinetic-controlled electrochemical events is sensitive to the nanoscopic area of the electrode rather than its geometric area. Thus, the mesoporous Pt electrode can be used to selectively enhance the faradaic current from a sluggish reaction.

According to the glucose measuring method of the present invention, the biosensor was inserted into the buffer solution containing glucose, and then constant potential was applied to measure the current change. As a buffer solution, phosphate buffer solution or phosphate buffered saline solution was used. Potential was applied between −0.1 V and 0.6 V vs. Ag/AgCl. Outside the range, side reactions such as adsorption/desorption of hydrogen, oxidation of platinum or reduction of platinum oxide, reduction of oxygen prevail rather than glucose oxidation, and so that it gets difficult to measure the glucose concentration. As a reference electrode, Ag/AgCl electrode was used.

Figure 4:
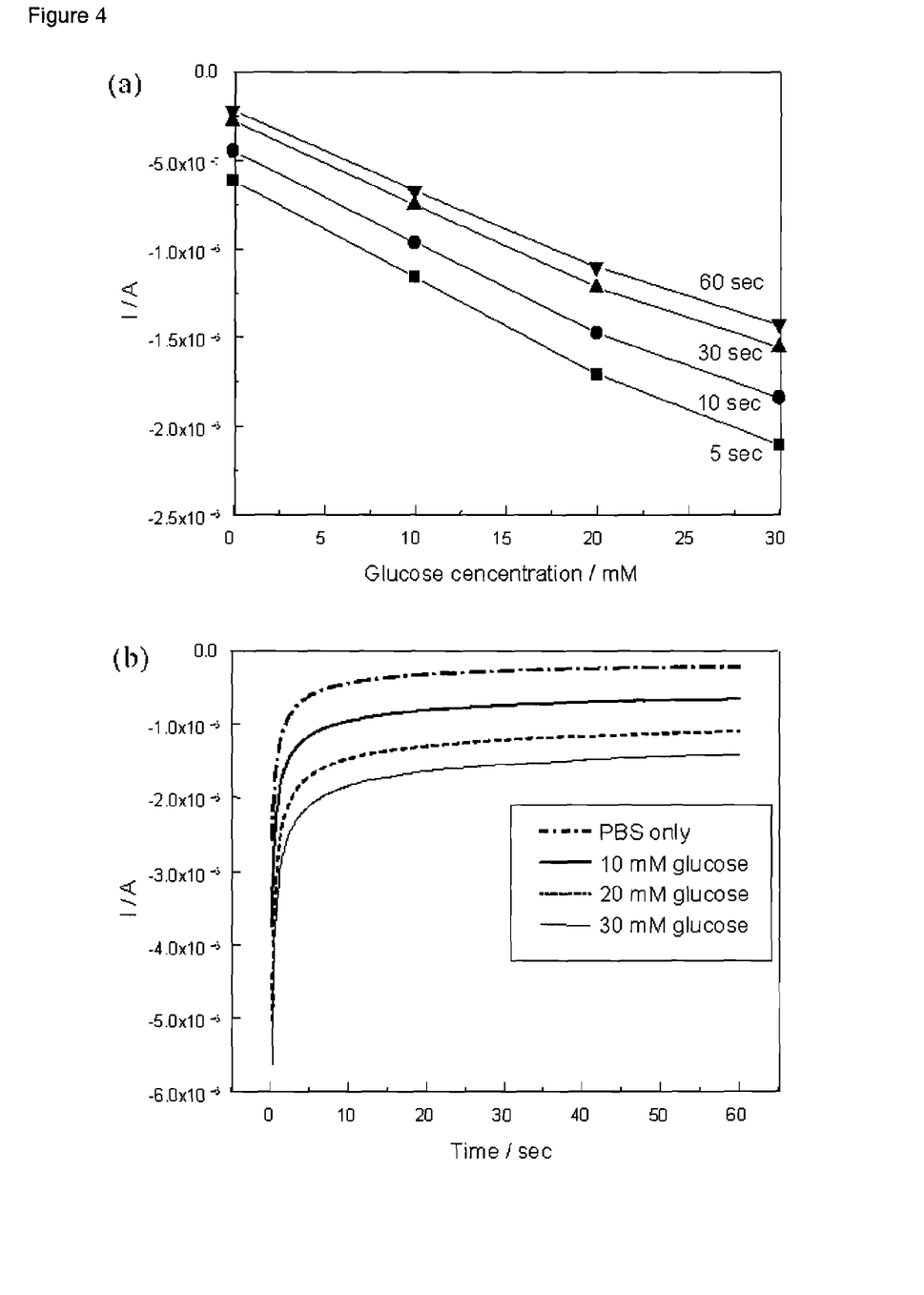
FIG. 4 are graphs of (a) current versus concentration and (b) the shape of current in the glucose solution of various concentration at 0.1 V versus mesoporous platinum oxide reference electrode.

FIG. 4 shows graphs of (a) current versus concentration and (b) the shape of current of various glucose concentrations in 0.1 M PBS solution containing 0.15 M chloride ion (pH 7.3) at 0.1 V versus mesoporous platinum oxide reference electrode. As illustrated in FIG. 4, the mesoporous platinum electrode of the present invention showed linear responses to the glucose concentration (increasing of the current with increasing of the glucose concentration), and negligible sensitivity for interfering agents. From these results, it was demonstrated that the glucose sensor selectively responses to glucose. The mesoporous platinum electrode showed selective responses to glucose even in the presence of high concentration (0.15 M) of chloride ion. This addresses the problem that the activities of the conventional electrochemical sensors are seriously decreased by the presence of the chloride ion, and implies that the mesoporous platinum of the present invention can be suitable for biosensors operating in biomaterials containing high levels of chlorides. Further, the mesoporous platinum electrode is mechanically or chemically robust, and is easily reproduced by electrochemical cleaning.

Figure 5:
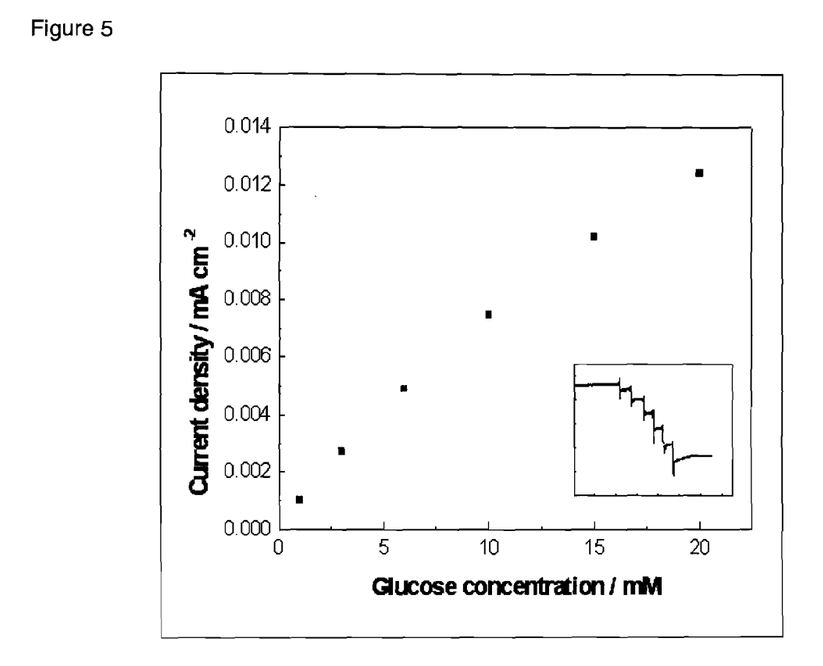
FIG. 5 is a calibration curve for the glucose response of the mesoporous metal electrode of the present invention in 0.1 M phosphate buffer containing 0.15 M NaCl (pH 7.4). The calibration curve was constructed based on current changes dependent upon increased glucose concentrations, which are shown in an inset of the graph.

Another example is depicted in FIG. 5. FIG. 5 is the calibration curve for glucose in 0.1 M phosphate buffer saline solution containing 0.15 M NaCl (pH 7.4). As shown in FIG. 5, the mesoporous metal electrode of the present invention showed linear response to the glucose concentration.

Use of the Mesoporous Platinum Electrode as a pH Sensor pH sensor was manufactured by using the large surface area of mesoporous $L_2$-ePt. This example shows that the mesoporous metal electrode from the non-liquid crystalline phase can be effectively applied for the quantification of hydrogen ion concentration. Please refer to Korean patent application No. 2004-110819 and the paper (*Analytical Chemistry*, 2005, 77(23), 7695) for detailed explanation of the operation principle of the mesoporous platinum as pH sensor. In the documents, detailed description for the utility of the mesoporous metal electrode made in the liquid crystalline phase as pH sensor was suggested.

Figure 6:
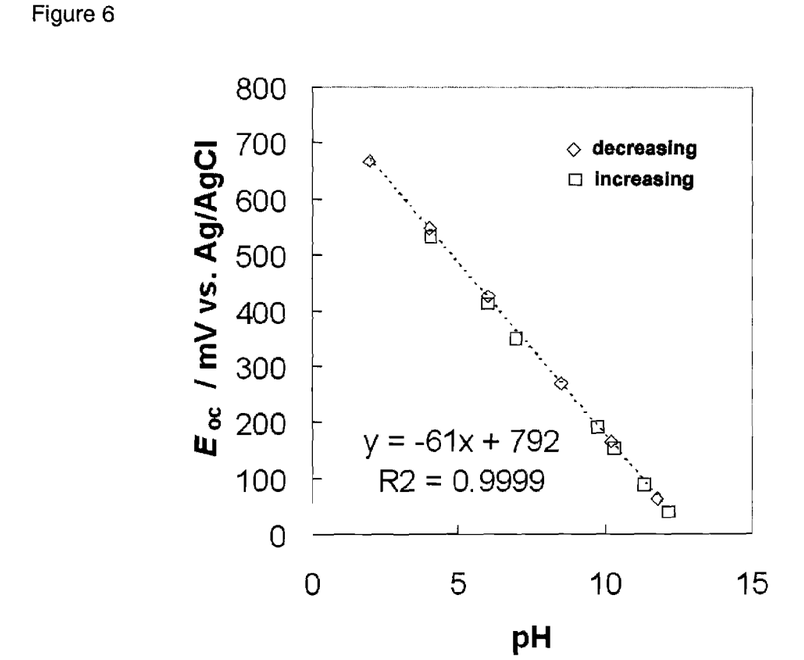
FIG. 6 is $E_{oc}$ versus pH curve of the mesoporous metal electrode of the present invention in a stirred and air-saturated phosphate solution. In the graph, pH was decreased by adding 0.1 M $H_3PO_4$ to 0.1 M $Na_3PO_4$ (□) and then increased by adding 0.1 M $Na_3PO_4$ again (□).

According to the pH measuring method of the present invention, oxidized $L_2$-ePt was inserted and zero current potential ($E_{oc}$) was measured in a standard buffer for glass electrode calibration (pH 4, 7, 10), PBS (pH 7.4), and NaOH solution (pH 13.8), respectively. The oxidation of $L_2$-ePt was conducted by applying 0.8 V vs. $Hg/Hg_2SO_4$ reference electrode for a constant time (typically 300 s) in 1.0 M $H_2SO_4$ solution. FIG. 6 is the $E_{oc}$ versus pH curve of the mesoporous metal electrode of the present invention in a stirred and air-saturated phosphate solution. In the graph, pH was decreased by adding 0.1 M $H_3PO_4$ to 0.1 M $Na_3PO_4$ (⊃) and then increased by adding 0.1 M $Na_3PO_4$ again (□). As shown in FIG. 6, the mesoporous metal electrode of the present invention exhibited increased exchange current, and improved sensitivity, stability, and response rate to hydrogen ion.

Use of the Mesoporous Platinum Electrode as a Reference Electrode

The usefulness of the mesoporous metal electrode prepared from the non-liquid crystalline phase as a reference electrode was tested. The $L_2$-ePt whose surface was oxidized can be used as a reference electrode in electrochemical detection system, as Ag/AgCl or $Hg/Hg_2SO_4$ does. Pay attention to the fact that the oxidized $L_2$-ePt was used instead of a commercial reference electrode in FIG. 4. FIG. 4 showed that electrochemical system operates successfully even though the oxidized $L_2$-ePt was used.

The invention claimed is:

1. A method for the fabrication of a mesoporous metal electrode which comprises chemically reducing a mixture comprising a solvent, a structure-directing agent and a source of a metal to deposit a metal-organic composite onto a substrate to obtain the mesoporous metal electrode, characterized in that the mixture is maintained in a non-liquid crystalline phase, the deposition of the metal-organic composite onto the substrate is performed in the non-liquid crystalline mixture, and the mixture is presented as an isotropic reverse micelle phase.

2. The method as set forth in claim 1, comprising the steps of:
   (a) maintaining a mixture comprising a solvent, a surfactant and a source of a metal in a non-liquid crystalline phase;
   (b) dipping a substrate into the mixture and reducing the mixture to deposit a metal-organic composite onto the substrate;
   (c) removing residues on the substrate onto which the metal-organic composite is formed; and
   (d) extracting the organic from the metal-organic composite.

3. The method as set forth in claim 1, wherein the mixture is present as an isotropic, non-liquid crystalline phase.

4. The method as set forth in claim 1, wherein the metal is selected from the group consisting of platinum, ruthenium, gold, nickel, palladium, silver, cobalt, iron, lead, tin and iridium.

5. The method as set forth in claim 1, wherein the deposition of the metal-organic composite onto the substrate is carried out by electroplating.

6. The method as set forth in claim 1, wherein the solvent is water and the structure-directing agent is a surfactant.

7. The method set forth in claim 1, wherein the structure-directing agent is a non-ionic surfactant.

8. A mesoporous metal electrode fabricated by the method of claim 1, comprising a substrate onto which a thin film having randomly distributed mesopores is formed.

* * * * *